US008341282B2

(12) United States Patent
Bassali et al.

(10) Patent No.: US 8,341,282 B2
(45) Date of Patent: Dec. 25, 2012

(54) HYBRID BUFFER MANAGEMENT

(75) Inventors: Harpal S. Bassali, Waltham, MA (US); Marcelo D. Lechner, Burlington, MA (US); Nosherwan Minwalla, Coppell, TX (US); Raul Aldrey, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 834 days.

(21) Appl. No.: 11/691,730

(22) Filed: Mar. 27, 2007

(65) Prior Publication Data
US 2008/0120389 A1 May 22, 2008

Related U.S. Application Data

(60) Provisional application No. 60/860,278, filed on Nov. 21, 2006.

(51) Int. Cl.
*G06F 15/16* (2006.01)
(52) U.S. Cl. ......... 709/231; 709/203; 709/217; 709/236
(58) Field of Classification Search .......... 709/230–237; 370/229–240
See application file for complete search history.

(56) References Cited

U.S. PATENT DOCUMENTS

| 6,188,670 | B1 | | 2/2001 | Lackman et al. | |
|---|---|---|---|---|---|
| 6,546,426 | B1 | * | 4/2003 | Post | 709/231 |
| 6,588,015 | B1 | | 7/2003 | Eyer et al. | |
| 6,754,715 | B1 | * | 6/2004 | Cannon et al. | 709/231 |
| 6,845,398 | B1 | | 1/2005 | Galensky et al. | |
| 6,993,251 | B1 | * | 1/2006 | Phillips et al. | 386/125 |
| 7,231,516 | B1 | * | 6/2007 | Sparrell et al. | 713/156 |
| 2002/0049746 | A1 | * | 4/2002 | De Roose | 707/1 |
| 2003/0021346 | A1 | * | 1/2003 | Bixby et al. | 375/240.25 |
| 2003/0067872 | A1 | | 4/2003 | Harrell et al. | |
| 2003/0067877 | A1 | | 4/2003 | Sivakumar et al. | |
| 2003/0099195 | A1 | * | 5/2003 | Lee | 370/229 |
| 2004/0242204 | A1 | | 12/2004 | Ido et al. | |
| 2005/0122923 | A1 | | 6/2005 | Jang et al. | |
| 2006/0026293 | A1 | * | 2/2006 | Virdi et al. | 709/231 |
| 2006/0095401 | A1 | | 5/2006 | Krikorian et al. | |
| 2006/0271982 | A1 | * | 11/2006 | Gallou et al. | 725/100 |
| 2007/0011327 | A1 | * | 1/2007 | Volodarsky et al. | 709/226 |
| 2007/0019547 | A1 | * | 1/2007 | Ho et al. | 370/401 |
| 2008/0212541 | A1 | * | 9/2008 | Vayanos et al. | 370/335 |

* cited by examiner

*Primary Examiner* — Ian N Moore
*Assistant Examiner* — Jenee Alexander

(57) ABSTRACT

A computing device selectively receives a media stream. A buffer included within the computing device selectively stores frames from the media stream, the buffer being configured to be a certain size. Program instructions within the computing device are for sending an alert message when the alert threshold is reached and for receiving, in response to the alert message, a flush instruction along with recovery information.

18 Claims, 4 Drawing Sheets

HYBRID BUFFER MANAGEMENT

This application claims priority to U.S. Provisional Patent Application Ser. No. 60/860,278, entitled "STREAMING MEDIA BUFFER LATENCY MANAGEMENT" and filed Nov. 21, 2006, which is fully incorporated herein by reference in its entirety.

BACKGROUND INFORMATION

Streaming media generally refers to media content that is, or at least may be, played via playback software or a playback device at the same time that the media content is being downloaded from a source such as a media server. Streaming media content, e.g., video and audio content, may be provided according to a variety of standards and formats. For example, video standards such as QuickTime and RealMedia, and also standards promulgated by the Motion Picture Experts Group (MPEG), etc. are well known.

Many standards for streaming media content, such as MPEG streaming content delivery, were designed with dual objectives of (1) preserving network bandwidth and (2) maintaining video quality. However, MPEG and most other kinds of media streams are not designed with an objective of timely delivery of content, e.g., diminishing latency. For example, at present, content processing devices such as set top boxes (STBs) generally use MPEG and are designed to deliver a complete video stream at the expense of latency.

A media stream such as an MPEG stream reaching a STB can potentially face network jitter which can cause excessive storage of media frames, e.g., video frames, in a buffer in the STB. Frames received by the STB are not displayed until all the prior frames are displayed. However, in some contexts, e.g., interactive applications such as gaming, users expect timely updates on their video displays in response to a key press. At present, latencies caused by jitter often leave users with a video stream that is unsatisfactory for supporting applications in a variety of contexts.

Online gaming is one context in which media stream latencies may result in an unsatisfactory user experience. For example, when gaming is provided through a content processing device such as a set top box (STB) or the like, a game session is delivered as an MPEG video stream or the like through a packet switched network from a game server in a Video Hub Office (VHO) to an STB in a customer premises. That is, the game session is conducted on the game server but is presented, through the MPEG stream, by the STB. Accordingly, the game session is encoded as an MPEG stream and streamed to the STB over the network. The MPEG stream is decoded by the STB and then displayed on a media playback device such as a television or video monitor. User inputs to the game are gathered through an input device such as a radio frequency (RF) or infrared remote control, a universal serial bus (USB) gamepad, etc. User inputs are then sent back to the game server over the packet switched network. The game server receives the user inputs and provides them to the game session for processing, thereby altering the output video stream where appropriate based on the inputs. Latencies in the MPEG stream may cause user inputs to be ill timed and/or ineffective, thus rendering the gaming experience unsatisfactory for the user.

Thus, many standards for providing streaming media, such as MPEG streaming content delivery, were designed with traditional objectives of (a) preserving network bandwidth and (2) maintaining video quality. However, as is the case with many media streams, MPEG video streams are not designed with an objective of timely delivery of content, e.g., diminishing latency. For example, at present, content processing devices such as set top boxes (STBs) are designed to deliver a complete video stream at the expense of latency.

DETAILED DESCRIPTION OF THE PREFERRED EMBODIMENTS

Figure 1:
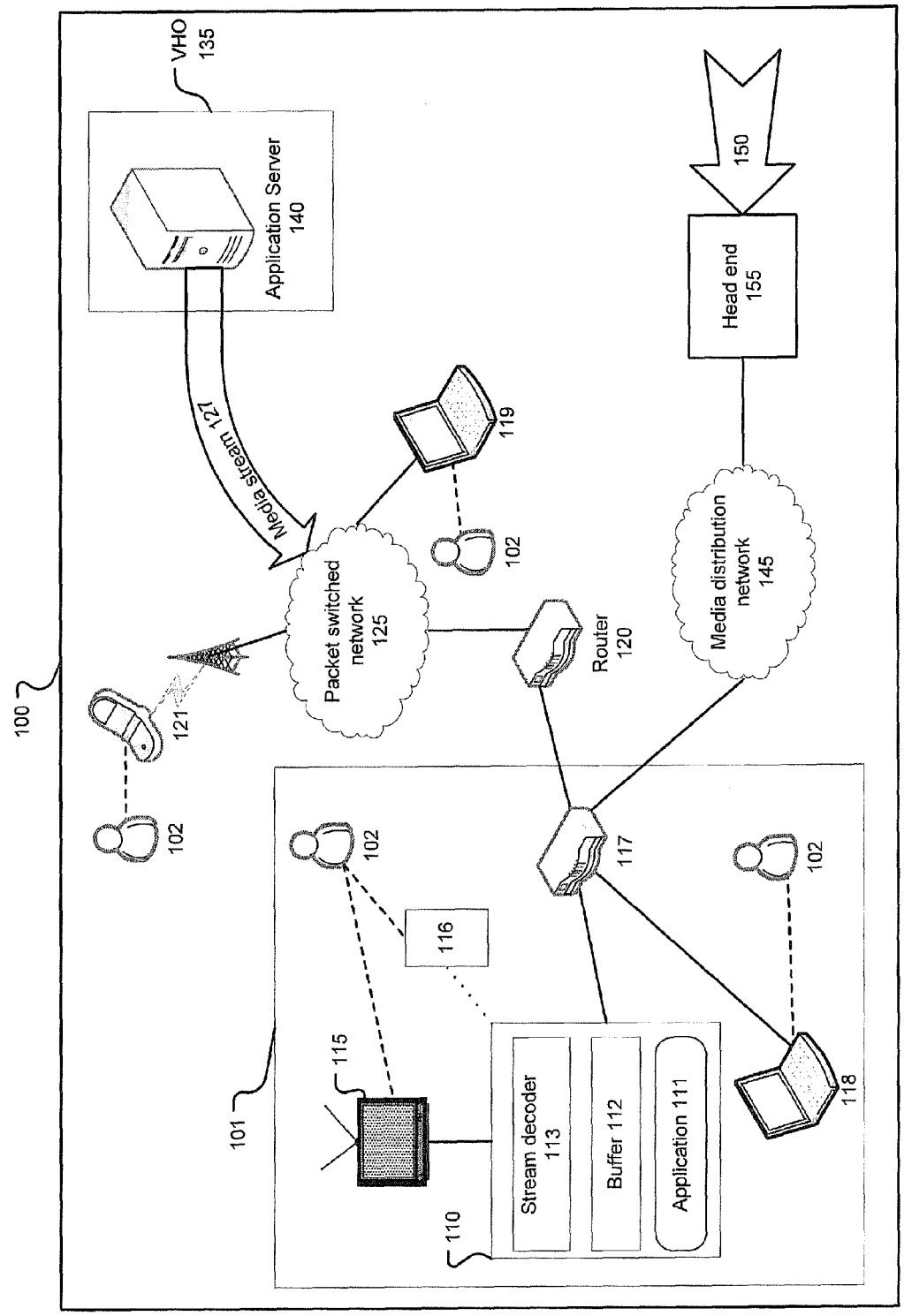
FIG. 1 illustrates an exemplary system for providing online gaming.

FIG. 1 illustrates an exemplary system 100 for providing online gaming to a customer premise 101, for access by a user 102 through a content processing device 110 and a media player 115. Customer premises 101 may be a home, business, or any other location including content processing device 110, and may include multiple content processing devices 110.

Content processing device 110 generally is a specialized device, e.g., a set top box (STB) or similar device, for receiving media content 150 from head end 155 via a network 145, and for providing media content 150 to a media player 115. Media content 150 may be provided as an analog signal or as a digital signal, e.g., an analog or digital video signal including a media stream. Content processing device 110 generally includes a processor and a memory, and may be provided with a proprietary or specialized operating system. For example, content processing device 110 may be an STB provided with a real time operating system (RTOS) such as is known. However, it is to be understood that the role generally ascribed to content processing device 110 herein may be filled by a computing device such as a computer 118 or 119 or a mobile device such as a cellular telephone 121, so long as the device is capable of receiving media content 150 from network 145 and/or media stream 127 through network 125, and is capable of storing and executing such program instructions as may be stored on a computer-readable medium. Further, such a computing device need not be located within customer premises 101, but generally may be located anywhere that it may access a packet switched network 125, as is illustrated by the placement of devices 119 and 121 in FIG. 1.

Content processing device 110 may include a gaming application 111. Gaming application 111 generally includes program instructions for, among other things, receiving media stream 127. Gaming application 111 further generally includes program instructions for providing media stream 127 to user 102 through media player 115, and for receiving instructions and inputs from user 102, e.g., via control 116, such instructions and inputs to be provided to a gaming application server 140. To facilitate the provision of media stream 127 through media player 115, content processing device 110 generally includes a frame buffer 112, a stream decoder 113, e.g., a video coder/decoder (codec), and an audio coder/decoder (codec), such as are known. When received in a content processing device 110, units, e.g., frames, of media stream 127 are generally stored in buffer 112 to await processing by decoder 113. It will be understood that decoder 113 may be an MPEG codec, e.g., for the MPEG-2 or MPEG-4 standards, such as is known. Additional program instructions within content processing device 110 operate to synchronize audio and video in media stream 127, properly scale video, etc.

Media player 115 receives media content 150 from content processing device 110, and plays such media content 150 so that it can be perceived by a user. Media player 115 may be a television receiver, such as is known, including a television or a high definition television (HDTV). Media player 115 may also be used to provide a user interface to certain functions and menus provided by content processing device 110. For example, a television may be used to display a graphical user interface to access various menus within a STB. Further, it is possible and in many cases likely that operations ascribed herein to content processing device 110 and media player 115 may all or mostly be performed by one of computing devices 118, 119, 121, etc., whereby media player 115 and/or content processing device 110 may be omitted from system 100.

A user 102 may utilize a control 116 to operate content processing device 110. Control 116 is generally a remote control that can selectively communicate with content processing device 110 through known wireless communications including infrared (IR) and radio frequency (RF) communications. Control 116 may include numeric keys, arrow buttons, keys for specific functions, directional keys, etc., and may also include alphanumeric keys. Control 116 may also be a wired or wireless keyboard or gamepad or another Human Interface Device (HID) as is known. A user 102 may utilize control 116 to select media content channels, access various menus and optional settings, make selections and requests, and input data, such as user instructions or user input for a gaming client application 111 included within content processing device 110. Control 116 generally facilitates access to various functions and menus provided by or through content processing device 110, and may also be used to control other devices, including media player 115. In addition to performing operations ascribed herein to media player 115 and/or content processing device 110, one of computing devices 118, 119, 121, etc. may also include keys, buttons, a touchpad, or the like to perform operations described herein with reference to control 116, whereby control 116 may be omitted from system 100.

Content processing device 110 selectively communicates with various devices via a broadband home router (BHR) 117, including computer 118, which may be accessed by a user 102. BHR 117 may be one or more devices that are generally known for routing network traffic. BHR 117 facilitates data transfer over one or more networks, including a packet switched network 125 and a media distribution network 145.

BHR 117 is known for distributing audio, video, and data to devices within customer premises 101 such as content processing device 110. For example, BHR 117 may be a broadband home router or wireless broadband home router from Actiontec Electronics, Inc. of Sunnyvale, Calif. BHR 117 may also provide a wired or wireless local area network (LAN), thereby providing selective communications between various devices within customer premises 110. For example, computer 118 may utilize BHR 117 to communicate with content processing device 110. Computer 118 may be a computer workstation, a desktop, notebook, laptop, handheld computer, a personal digital assistant (PDA), a cellular phone, a smart-phone, or some other computing device utilizing hardware and software to communicate with content processing device 110.

Content processing device 110 may use BHR 117 to send information to, and receive information from, a packet switched network 125. BHR 117 may access packet switched network 125 through a gateway router 120.

Content processing device 110 may also receive, via a packet switched network 125, a media stream 127. Various sources within a video hub office (VHO) 135 may provide media stream 127, including a gaming application server 140. Media stream 127 may be provided according to any one of a number of known standards, such as MPEG. Gaming server 140 is known for providing various interactive gaming applications for user 102, such applications providing media stream 127.

A media distribution network 145 is a network for providing media content 150, such as is known. For example, network 145 may include hardware and software for providing a video signal via a coaxial cable and/or a fiber optic cable. As is known, media content 150 is generally provided to a media distribution network 145 from a head end 155.

Packet switched network 125 is generally an internet protocol (IP) network that utilizes known protocols found generally within the internet protocol suite. For example, network 125 uses protocols such as user datagram protocol (UDP), transmission control protocol (TCP), hypertext transfer protocol (HTTP), etc. Further, network 125 may include a variety of networks such as a wide area network (WAN), e.g., the Internet, a local area network (LAN), a fiber-optic network, etc. As is known, packet switched network 125 may be used to transport a variety of data, including multimedia data, such as audio and video. Accordingly, it is to be understood that embodiments are possible in which networks 125 and 145 are in fact combined into a single network, or in which media distribution network 145 is simply omitted, whereby packet switched network 125 is used to provide media content 150 to content processing device 110, computer 118, etc.

Gateway router 120 is known for routing data packets in packet switched network 125. Gateway router 120 allows content processing device 110 to access packet switched network 125. By communicating with router 120, content processing device 110 is able to obtain a network address such as an internet protocol (IP) address, thereby enabling content processing device 110 to make requests to, and to receive data from an application server 140, etc.

Computing devices such as content processing device 110, client computer 118, gaming application server 140, and similar devices may employ any of a number of known computer operating systems. For example, such devices may use any known versions and/or varieties of the Microsoft Windows operating system; the Unix operating system (e.g., the Solaris operating system distributed by Sun Microsystems of Menlo Park, Calif.); the AIX UNIX operating system distributed by International Business Machines of Armonk, N.Y.; and the Linux operating system and the Vortex operating system distributed by Motorola, Inc. of Schaumberg, Ill. Computing devices may include any one of a number of computing devices that are known, including, without limitation, a computer workstation, a desktop, notebook, laptop, handheld computer, STB, or some other computing device.

Computing devices, such as content processing device 110 and other devices mentioned herein, generally are capable of executing instructions stored on a computer readable medium, such as instructions included in application 111. Computer-executable instructions may be compiled or interpreted from computer programs created using a variety of known programming languages and/or technologies, including, without limitation, and either alone or in combination, Java, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computing device. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Figures 2, 3:
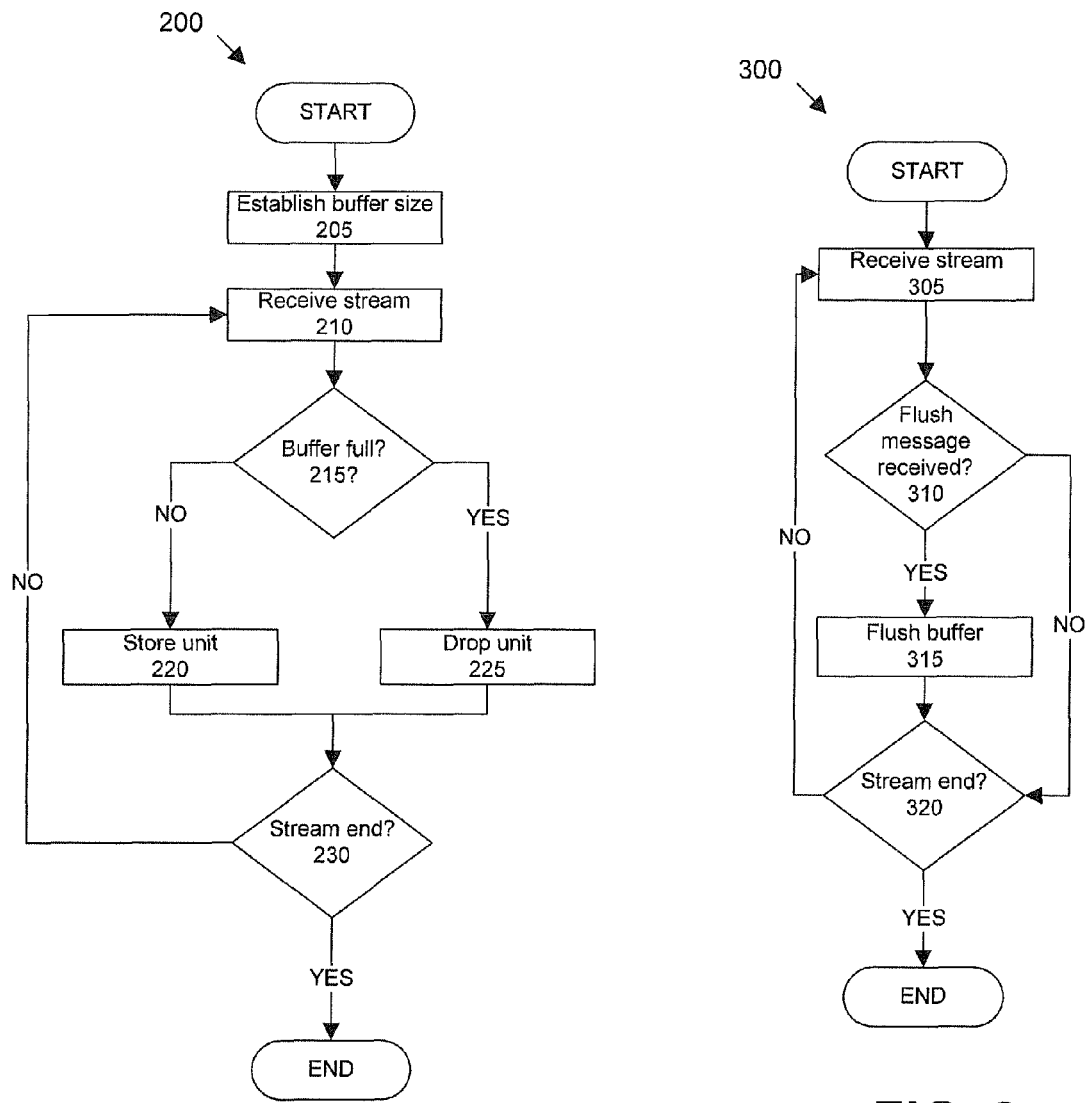
FIG. 2 illustrates an exemplary buffer management process.
FIG. 3 illustrates an exemplary process by which a buffer is flushed according to an instruction received from a server.

FIG. 2 illustrates an exemplary buffer management process 200 that uses an adjusted buffer size effectively, i.e., from the perspective of a user device 118, 119, 121, etc., to limit the maximum delay permitted to be experienced by a media unit, e.g., a frame of video, and to drop the frame from the buffer 112 if the limit is expected to be exceeded. Process 200 advantageously consumes minimal resources on content processing device 110. Process 200 further provides the advantage of consuming minimal resources on an application server such as server 140. It will be seen that process 200 results in removing most recent units, e.g., frames of video, in media stream 127.

In step 205, application 111 establishes a size for buffer 112, e.g., a maximum number of units, e.g., frames, from media stream 127 that may be stored in buffer 112. The size of buffer 112 established in step 205 may be predetermined according to program instructions in application 111, or may be determined according to a message from server 140. The size of buffer 112 may be established or modified at any time including stream initialization as well as during streaming. Determining the size of buffer 112 according to a message or instruction from server 140 provides flexibility in effectively providing different time delays for different kinds of media streams 127, e.g., different kinds of games, that may be provided from server 140 through application 111. Further, a game may be interrupted by a different media application, e.g., an advertisement, that will tolerate a different level of latency. In general, different media streams 127 may tolerate more or less latency than others. It is to be understood that limiting the size of buffer 112 effectively provides a maximum time delay that units of media stream 127 may spend in the buffer 112 by dropping units of media stream 127, e.g., one or more data packets, when the buffer 112 is full. That is, when the buffer 112 is full, units of media stream 127 must be dropped rather than provided on a delayed basis.

Next, in step 210, content processing device 110, according to instructions in application 111, receives a unit in media stream 127 from application server 140, generally through network 125 as described above.

Next, in step 215, content processing device 110, according to instructions in application 111, determines whether buffer 112 is full. If buffer 112 is not full, step 220 is executed next. Otherwise, step 225 is executed next.

In step 220, application 111 stores the unit, e.g., video frame, from media stream 127 that was received in step 210 in buffer 112.

In step 225, the unit received in step 210 is dropped, application 111 having determined in step 215 above that the buffer 112 is full.

Next, in step 230, application 111 determines whether media stream 127 has ended or is continuing, i.e., whether there are additional frames to process. If so, process 200 returns to step 210. Otherwise, process 200 ends.

With respect to process 200 and other processes described herein, it is to be understood that that media stream 127, once initiated, is generally provided in a substantially continuous fashion, and generally continues to be provided as set forth above with reference to step 210 even as other steps in process 200 (or other processes, as applicable) are executed. It is to be understood that various steps of the process 200 may be executed concurrently for different frames in media stream 127. That is, processing of steps 215 through 240 for a first frame may not be completed before processing is commenced for a second frame. Accordingly, FIG. 2 illustrates process 200 with respect to a single frame in media stream 127 but is not intended to belie real world examples in which multiple frames in media stream 127 are processed simultaneously or concurrently. For example, after storing a first frame in step 215, a second frame may be stored as described in step 215 even before step 230 is executed with respect to the first frame. Further, although the removal of frames from a buffer 112 is not referenced with respect to process 200, it is to be understood that a buffer 112 may become full, or approach a threshold, even when units, e.g., frames, are being removed from the buffer 112 by gaming application 111.

FIG. 3 illustrates an exemplary process 300 by which buffer 112 is flushed according to an instruction received from server 140. Process 300 provides the advantage of consuming minimal resources in content processing device 110 and moreover is relatively simple to implement in the client device. Further, the buffer 112 when flushed according to process 300 advantageously preserves most recent and "important" frames of video.

In step 305, content processing device 110, according to instructions in application 111, receives media stream 127 from application server 140, generally through network 125 as described above.

Next, in step 310, application 111 determines whether it has detected an instruction to flush buffer 112 in media stream 127. For example, when received from network 125, media stream 127 is a stream of packets including headers and other fields as are known. Such packets may include audio information, video information, etc. as part of media stream 127. However, it is also possible that such packets may include information providing instructions to application 111. For example, server 140 may provide an instruction according to program instructions that determine that a particular frame or set of frames to be stored in buffer 112 are of particular importance, and therefore frames presently in buffer 112 should be dropped to accommodate such upcoming frame or set of frames. Accordingly, application 111 may be instructed to flush buffer 112. For example, such an instruction may be included in a known manner in an MPEG transport stream. Alternatively, such an instruction could be included in an independent control stream in a known manner. Advantageously, such an instruction may be tailored to the particular application, e.g., a particular game, being provided by server 140. In any event, if an instruction to flush buffer 112 is received from server 140 in step 310, step 315 is executed next. Otherwise, step 320 is executed next.

Next, in step 315, application 111 causes buffer 112 to be flushed. Accordingly, buffer 112 will be free for incoming frames in media stream 127, and such incoming frames will be processed immediately from buffer 112 by codec 113 and codec 114.

Next, in step 320, application 111 determines whether media stream 127 has reached its end. If so, process 300 ends. Otherwise, process 300 returns to step 305.

Figure 4:
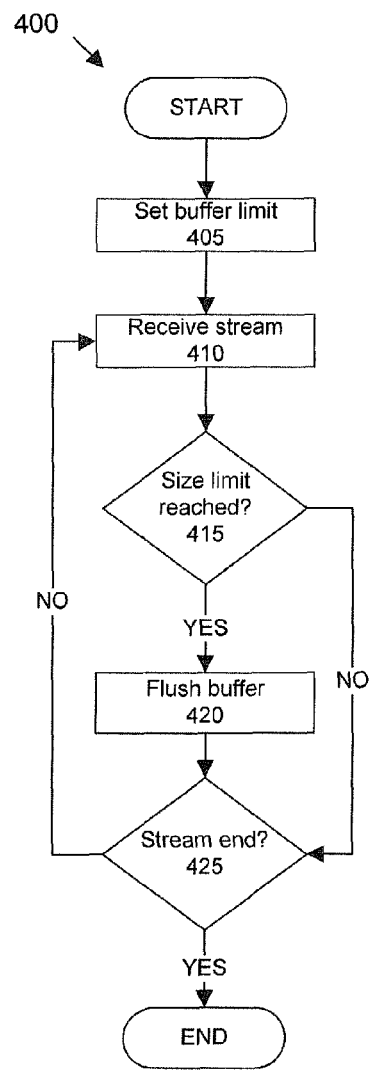
FIG. 4 illustrates an exemplary process for flushing buffer when a predetermined application-specific buffer size limit is reached.

FIG. 4 illustrates an exemplary process 400 for flushing buffer 112 when a predetermined application-specific buffer size limit is reached. It is important to note that a buffer 112 flush according to process 400 is triggered by conditions within buffer 112 and not by server 140. The approach of process 400 has the advantages of providing dynamic buffer limit adjustment during a game session to compensate for delays in other system 100 elements such as network 125, server 140, etc., and moreover preserves the most recent frame. Further, process 400 requires an implementation by an application vendor such as a gaming vendor to measure end-to-end latency and flush the buffer appropriately, i.e., to establish an application-appropriate size limit for buffer 112.

In step 405, a size limit for buffer 112 is established. It is to be understood that this size limit may be modified in the course of receiving media stream 127, as mentioned above. For example, a server 140 may send an instruction to application 111 to set a size limit for buffer 112 based on an application, e.g. a game, requested by user 102.

Next, in step 410, content processing device 110, according to instructions in application 111, receives media stream 127 from application server 140, generally through network 125 as described above.

Next, in step 415, application 111 determines whether the size limit for buffer 112 established in step 405 has been reached. If the size limit has been reached, step 420 is executed next. Otherwise, step 425 is executed next.

In step 420, buffer 112 is flushed. Note that it is possible to perform process 400, and in particular step 420, by partially rather than completely flushing buffer 112. In the event of partially flushing buffer 112, flushed frames are the oldest frames in the buffer, which is desirable inasmuch as it is generally desirable to retain the most recently received frames in buffer 112. As with a complete buffer 112 flush such as might be performed in step 420, a partial buffer 112 flush may provide a dynamic buffer limit adjustment during a game session to compensate for delays in other system 100 elements such as network 125, server 140, etc., and a partial buffer 112 flush preserves most recent frame. Further, as with a complete buffer 112 flush, a partial buffer 112 flush utilizes an implementation by an application vendor such as a gaming vendor to measure end-to-end latency and to flush the buffer appropriately, i.e., to establish an application-appropriate size limit for buffer 112.

In step 425, application 111 determines whether media stream 127 has reached its end. If so, process 400 ends. Otherwise, process 400 returns to step 410.

Figure 5:
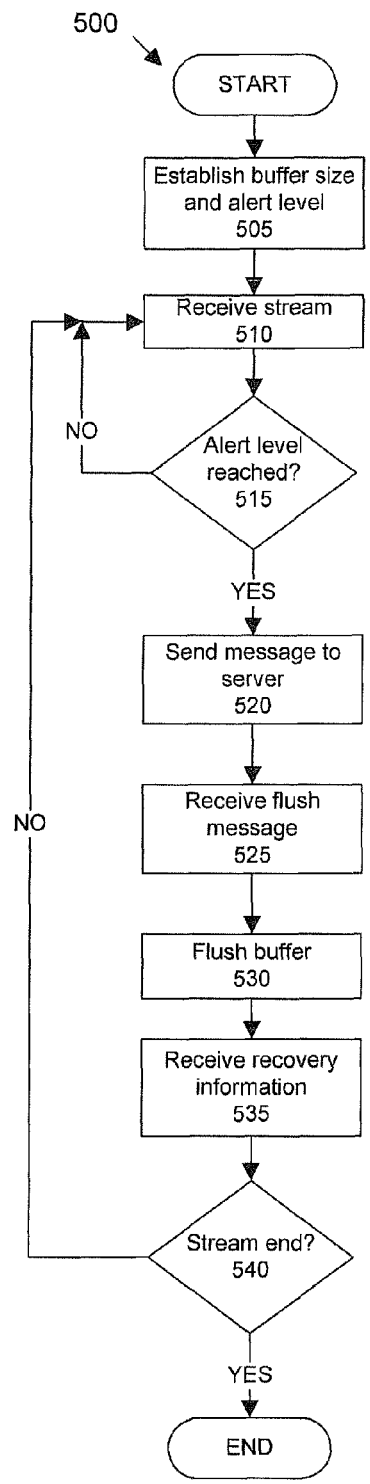
FIG. 5 illustrates an exemplary process that is a hybrid of a process for locally controlling a buffer and a process for triggering a flush of a buffer from a server.

FIG. 5 illustrates an exemplary process 500 that is a hybrid of a process for locally controlling buffer 112 and a process for triggering a flush of buffer 112 from server 140.

Step 505 is similar to step 205 described above, except that step 505 additionally includes the establishment of an alert level related to the size of buffer 112 that has also established in this step. The alert level established in this step 505 generally may be expressed as some fraction of the size of buffer 112. Again, it is to be understood that both the alert level and the size of the buffer 112 may be modified on the fly, i.e., while media stream 127 is being received. As will be seen below, the purpose of the alert level established in this step is to provide a mechanism for sending a warning to server 140 that buffer 112 may soon be filled. That is, the alert level may be thought of as a threshold for providing alerts concerning the status of buffer 112.

Next, step 510 is executed in a manner similar to that described above for step 210 process 200.

Next, in step 515, content processing device 110 determines whether the alert level established in step 505 has been reached, i.e., whether buffer 112 has been filled up to or past the alert level, i.e., threshold. If not, process 500 returns to step 510. Otherwise, step 520 is executed next.

In step 520, content processing device 110, generally according to program instructions in application 111, sends a message to server 140 to inform server 140 that the alert level for buffer 112 has been reached.

Next, in step 525, server 140 sends, and content processing device 110 receives, a message to flush buffer 112.

Next, in step 530, content processing device 110, generally according to program instructions and application 111, causes buffer 112 to be flushed.

Next, in step 535, server 140 sends, and content processing device 110 receives, information to allow stream decoder 113 to recover from the flush of buffer 112 are formed as described above with respect to step 530. For example, in an MPEG stream, it is known that a decoder expects video frames to arrive in sequence, and further depends on receiving reference frames that are used to decode not only themselves but other frames that depend from the reference frame. Accordingly, when buffer 112 is flushed, it may be necessary to re-supply reference frame information to stream decoder 113 in order to allow media stream 127 to continue to be decoded without serious, or even noticeable, disruption to the experience of user 102.

Next, application 111 determines whether media stream 127 has reached its end. If so, process 500 ends. Otherwise, process 500 returns to step 510.

Exemplary embodiments discussed herein include a network-based streaming gaming service, and are further discussed in the context of streaming video. However, embodiments are possible and contemplated that extend to any media streaming service where timely delivery of content, in addition to reducing latency, is advantageous. For example, media stream 127 could include still images, data, or the like providing stock ticker information.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
    establishing, by a content processing device for a buffer, a limited size for the buffer that is specific to a media stream provided by an application server, the limited size providing a maximum time delay for frames of the media stream to spend in the buffer;
    establishing, by the content processing device, an alert threshold for the buffer, the alert threshold comprising a threshold size that is a portion of the limited size for the buffer;
    receiving, by the content processing device, the media stream from the application server via a packet-switched network;
    storing, by the content processing device, frames from the received media stream in the buffer;
    sending, by the content processing device, an alert message to the application server when the alert threshold is reached;
    receiving, by the content processing device from the application server in response to the alert message, a flush instruction;
    receiving, by the content processing device from the application server in response to the alert message, recovery information for decoding the received media stream after the flush instruction is executed, the recovery information replacing reference frame information to be flushed from the buffer in accordance with the flush instruction; and
    executing, by the content processing device, the flush instruction by only partially flushing the buffer to reduce the buffer to a size that is below the alert threshold, wherein the flush instruction is executed while the media stream is received from the application server via the packet-switched network such that at least a most recently received one of the frames in the buffer is preserved.

2. The method of claim 1, wherein the executing of the flush instruction further comprises dropping from the received media stream at least a subset of the frames stored in the buffer rather than providing the at least a subset of the frames to a decoder on a delayed basis; and
    using, by the content processing device, the recovery information to decode the received media stream after the flush instruction is executed.

3. The method of claim 1, further comprising providing, by the content processing device, decoded output to a media player.

4. The method of claim 1, wherein the media stream is formatted according to a standard of the Motion Picture Experts Group (MPEG).

5. The method of claim 1, tangibly embodied on a non-transitory computer-readable medium as computer-executable instructions.

6. The method of claim 1, wherein the limited size for the buffer is established as an application-appropriate size limit based on a measured end-to-end latency.

7. The method of claim 1, wherein the establishing of the limited size for the buffer comprises determining the limited size according to a message received from the application server.

8. The method of claim 1, further comprising modifying, by the content processing device, the limited size for the buffer while the media stream is being received.

9. The method of claim 1, wherein the application server comprises a gaming application server that provides an interactive gaming application, wherein the media stream received from the application server represents a presentation of a game session of the interactive gaming application being conducted at the gaming application server.

10. A system, comprising:
    a computing device that selectively receives a media stream from an application server via a packet-switched network;
    a buffer included within the computing device that selectively stores frames from the media stream, the buffer configured to be a certain limited size specific to the media stream provided by the application server, the limited size providing a maximum time delay for the frames of the media stream to spend in the buffer; and
    program instructions within the computing device for
        establishing an alert threshold for the buffer, the alert threshold comprising a threshold size that is a portion of the limited size for the buffer,
        sending an alert message from the computing device to the application server when the alert threshold is reached,
        receiving, from the application server in response to the alert message, a flush instruction,
        receiving, from the application server in response to the alert message, recovery information for decoding the received media stream after the flush instruction is executed, the recovery information replacing reference frame information to be flushed from the buffer in accordance with the flush instruction, and
        executing the flush instruction by only partially flushing the buffer to reduce the buffer to a size that is below the alert threshold, wherein the flush instruction is executed while the media stream is received from the application server via the packet-switched network such that at least a most recently received one of the frames in the buffer is preserved.

11. The system of claim 10, wherein the executing of the flush instruction further comprises dropping from the received media stream at least a subset of the frames stored in the buffer rather than providing the at least a subset of the frames on a delayed basis; and
    a decoder that uses the recovery information to decode the received media stream after the flush instruction is executed.

12. The system of claim 11, further comprising a media player that selectively receives decoded output from the decoder.

13. The system of claim 10, wherein the media stream is formatted according to a standard of the Motion Picture Experts Group (MPEG).

14. A method comprising:
- establishing, by a content processing device for a buffer, a limited size for the buffer that is specific to a media stream provided by an application server, the limited size providing a maximum time delay for frames of the media stream to spend in the buffer;
- establishing, by the content processing device, an alert threshold for the buffer, the alert threshold being smaller than the limited size of the buffer;
- receiving, by the content processing device, the media stream from the application server via a packet-switched network;
- storing, by the content processing device, frames from the received media stream in the buffer to await processing by a decoder;
- sending, by the content processing device, an alert message to the application server when the alert threshold is reached;
- receiving, by the content processing device from the application server in response to the alert message, a flush instruction;
- receiving, by the content processing device from the application server in response to the alert message, recovery information for decoding the received media stream after the flush instruction is executed, the recovery information replacing reference frame information to be flushed from the buffer in accordance with the flush instruction;
- executing, by the content processing device, the flush instruction by only partially flushing the buffer to reduce the buffer to a size that is below the alert threshold, wherein the flush instruction is executed while the media stream is received from the application server via the packet-switched network such that at least a most recently received one of the frames in the buffer is preserved; and
- using, by the content processing device, the recovery information to decode the received media stream after the flush instruction is executed, wherein the using of the recovery information comprises resupplying reference frame information to the decoder.

15. The method of claim 14, further comprising providing, by the content processing device, decoded output to a media player.

16. The method of claim 14, wherein the media stream is formatted according to a standard of the Motion Picture Experts Group (MPEG).

17. The method of claim 14, tangibly embodied on a non-transitory computer-readable medium as computer-executable instructions.

18. The method of claim 14, wherein the partial flushing of the buffer flushes an oldest of the frames from the buffer.

* * * * *